(12) United States Patent
Marschner et al.

(10) Patent No.: US 12,361,722 B2
(45) Date of Patent: Jul. 15, 2025

(54) SYSTEM AND METHOD TO TRACK A COUPLED VEHICLE

(71) Applicant: Connaught Electronics Ltd., Tuam (IE)

(72) Inventors: Henrik Marschner, Kronach Neuses (DE); Vera Stehr, Kronach Neuses (DE); Ana Robleda, Tuam (IE); Yerai Berenguer, Tuam (IE); Enrique Romay-Castineira, Tuam (IE); Daniel Garcia, Porrino (ES); Alan Murphy, Tuam (IE); Alan Hanniffy, Tuam (IE); Swaroop Shivamurthy, Tuam (IE)

(73) Assignee: CONNAUGHT ELECTRONICS LTD., Tuam (IE)

( * ) Notice: Subject to any disclaimer, the term of this patent is extended or adjusted under 35 U.S.C. 154(b) by 350 days.

(21) Appl. No.: 17/917,390

(22) PCT Filed: Apr. 7, 2021

(86) PCT No.: PCT/EP2021/059047
§ 371 (c)(1),
(2) Date: Oct. 6, 2022

(87) PCT Pub. No.: WO2021/204867
PCT Pub. Date: Oct. 14, 2021

(65) Prior Publication Data
US 2023/0154197 A1    May 18, 2023

(30) Foreign Application Priority Data
Apr. 7, 2020    (DE) .................... 10 2020 109 598.8

(51) Int. Cl.
*G06V 20/58*    (2022.01)
(52) U.S. Cl.
CPC ................................ *G06V 20/58* (2022.01)

(58) Field of Classification Search
CPC ..... G06V 20/58; B62D 13/06; G06K 9/00791
See application file for complete search history.

(56) References Cited

U.S. PATENT DOCUMENTS

| 2018/0043933 A1 | 2/2018 | Hu et al. |
| 2018/0253608 A1 | 9/2018 | Diessner et al. |

FOREIGN PATENT DOCUMENTS

| DE | 102017106152 A1 | 9/2018 |
| WO | 2018/153915 A1 | 8/2018 |

OTHER PUBLICATIONS

International Search Report and Written Opinion in corresponding International Application No. PCT/EP2021/059047, mailed Jul. 8, 2021 (9 pages).

(Continued)

*Primary Examiner* — Sam Bhattacharya
(74) *Attorney, Agent, or Firm* — Osha Bergman Watanabe & Burton LLP

(57) ABSTRACT

A method for providing a yaw angle (105*a*) between a first vehicle (110) coupled to a second vehicle (100), comprises: receiving an image of the first vehicle from a camera (101) mounted on the second vehicle; performing (210) a polar transformation on the image to form a polar image (400) in a polar space having an origin corresponding to a location of a pivot point (303) of the coupling (302) to the second vehicle in the received image coordinate space; estimating (230) an optical coupling angle by analysing the content of the polar image; receiving a signal from an odometer (102) mounted on the first or second vehicle; estimating a kinematic coupling angle from the signal and a kinematic model of the first vehicle and the coupled second vehicle; and combining the estimated optical coupling angle and the estimated kinematic coupling angle to provide the coupling angle.

18 Claims, 10 Drawing Sheets

(56) References Cited

OTHER PUBLICATIONS

German Search Report in corresponding German Application No. 10 2020 109 598.8, dated Nov. 11, 2022 (11 pages).
Caup, Lukas, et al. Video-based trailer detection and articulation estimation. In: 2013 IEEE Intelligent Vehicles Symposium (IV). IEEE, 2013. S. 1179-1184, veröffentlicht am Oct. 15, 2013 (6 pages).

SYSTEM AND METHOD TO TRACK A COUPLED VEHICLE

FIELD

The present application relates to a system and method for tracking the yaw angle of a coupled vehicle, such as a trailer.

BACKGROUND

It is helpful for a driver of a vehicle to know the coupling angle, or yaw angle, between a vehicle and a coupled vehicle, such as a trailer. This knowledge is especially useful when manoeuvring the vehicle in a reverse direction.

Various methods are known to interrogate signals from sensors, such as optical sensors, to track the yaw angle. As an example, a known yaw angle measurement process includes applying a target to a trailer in a pre-determined location and tracking the target position with a camera mounted on the vehicle. The target location is need used to infer the trailer position and the yaw angle. Target based methods are however sensitive to target condition and placement.

At least one of problems with targets, adverse weather, lighting and environmental conditions will disrupt the operation of known camera-based yaw angle tracking methods.

WO2018/153915 relates to a method for determining an angular position of a trailer by obtaining an image of part of a trailer by means of a rear camera of a towing vehicle. The image is divided into blocks and a texture value is determined for each block. Blocks with texture values that meet a predetermined repetition criterion are labelled. Finally, the angular position of the trailer is determined from the location of the labelled blocks.

US2018/0253608 relates to a trailer angle detection system that processes images to detect a portion of the trailer that is being towed by the vehicle. The trailer angle detection system determines an angle of the trailer relative to the vehicle by determining which columns of photo-sensing elements sense the detected portion of the trailer.

It is an object of the present invention to measure the yaw angle in a manner that addresses at least some of the deficiencies in known methods.

SUMMARY

The present invention is defined by the independent claim. The dependent claims provide further optional features. In brief, the disclosed system and method track the yaw angle of one vehicle that is towed by another.

The method accurately measures the yaw angle regardless of whether the towing vehicle is going forward (away from the towed vehicle) or backwards. By appropriately combining camera data and odometry data, the yaw angle is measured in a manner that does not require targets and is robust to adverse weather, lighting and environmental conditions. The method may also use existing sensors on the towing vehicle and does not require modification of the towed vehicle.

The presented method is robust and widely applicable to towing vehicle and trailers. It can be applied to any system of coupled vehicles.

BRIEF DESCRIPTION OF THE DRAWINGS

Embodiments of the invention will now be described, by way of example, with reference to the accompanying drawings, in which.

DESCRIPTION

Figure 1:
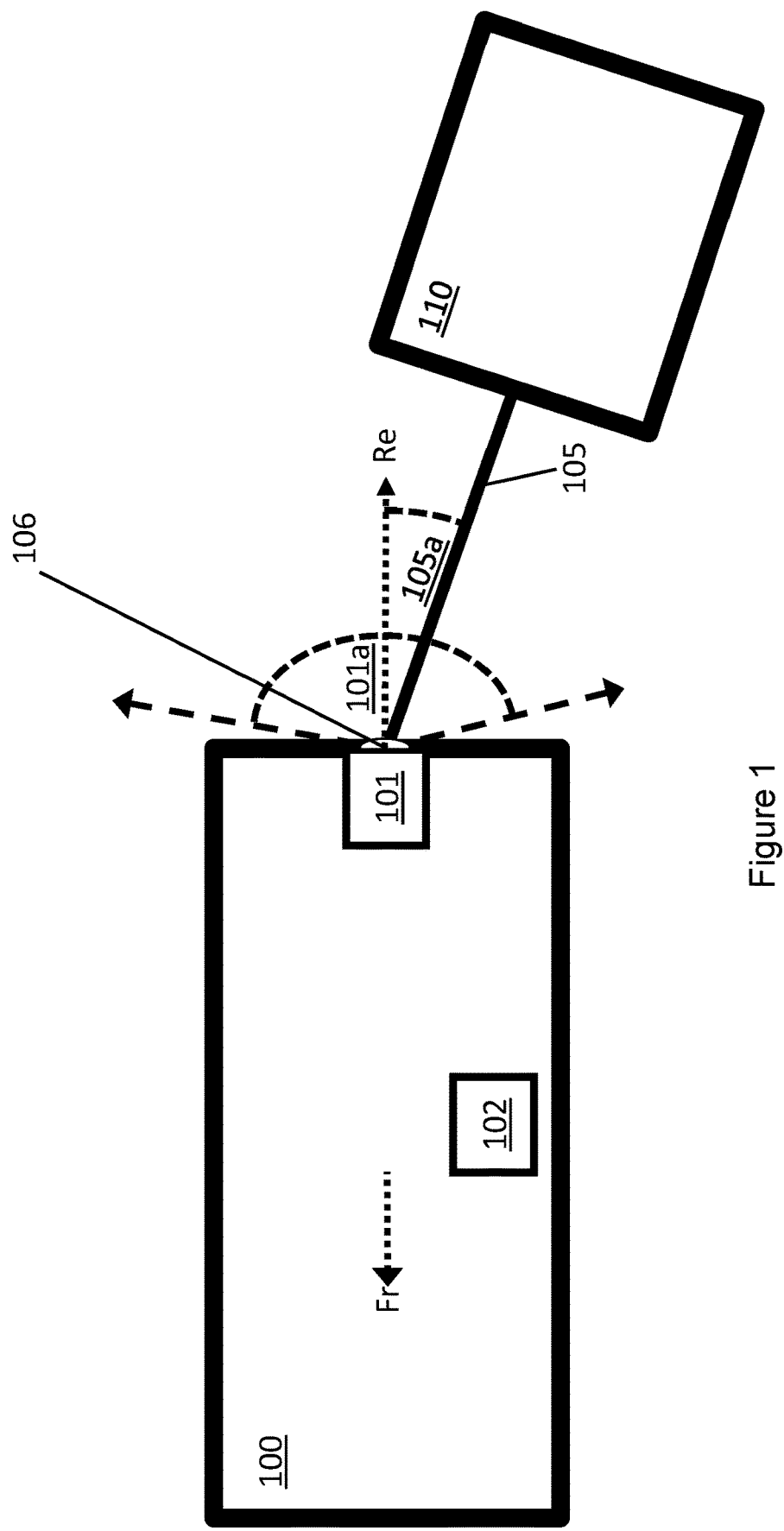
FIG. 1 shows a vehicle and a coupled trailer. The vehicle has a mounted camera orientated towards the trailer.

FIG. 1 shows an example of a vehicle 100 with a trailer 110 coupled to the vehicle 100 by a connector 105. The connector 105 is coupled to the vehicle at a pivot point 106. The vehicle 100 comprises a mounted camera 101. The mounted camera 101 is orientated such that its field of view 101a covers at least part of the trailer 110 and the connector 105.

The field of view 101a is wide and this is typically achieved by the camera 101 having a wide field of view lens, such a fisheye lens. A fisheye lens is preferable as these are generally cylindrically symmetric. In other applications of the invention, the field of view may be less or more than 180 degrees. Whilst a fisheye lens is preferred, any other lens that provides a wide field of view can be used. In this context, a wide field of view is a lens having a field of view over 100 degrees, preferably over 150 degrees and more preferably over 170 degrees.

The sensitivity of the camera used in the invention need not be limited to any specific range of wavelengths but most commonly it will be used with cameras that are sensitive to visible light. The camera 101 will generally be in the form of a camera module comprising a housing for a lens and a sensor, the lens serving to focus light onto the sensor. The camera module may also have electronics to power the sensor and enable communication with the sensor. The camera module may also comprise electronics to process the image. The processing can be low level image signal processing, for example, gain control, exposure control, white balance, denoise, etc. and/or it can involve more powerful processing for example, for computer vision.

The coupling angle, or yaw angle, 105a may be measured from the rear direction Re which is opposed and parallel to the front direction Fr in which the vehicle 100 travels when it is moving straight forward. In the embodiment, the rear direction Re is parallel with the optical axis 101a of the camera 101.

The yaw angle 105a may be estimated using a model, such as a kinematic model, and sensors 102 on the vehicle 100. However, such models do not accurately predict the yaw angle when the vehicle is moving in the rear direction Re. The inaccuracy arises because when the trailer 110 is pushed, the trailer 110 will pivot around pivot point 106 in an unpredictable way. As an example, if the trailer 110 is initially straight behind i.e. aligned with the vehicle 100, as the vehicle 100 moves in a rearward direction Re the trailer 110 will deviate from alignment. However, whether the deviation occurs to the left or to the right cannot be predicted from a kinematic model.

As explained in the background, known methods to measure the yaw angle 105a based on optical tracking are sensitive to target condition and placement, weather conditions, lighting, and other environmental conditions.

The present invention combines optical tracking and kinematic model-based tracking (kinematic tracking) to estimate a yaw angle 105a with a confidence level. The optical tracking incorporates a multi-resolution and multi-modality approach to overcome potential drawbacks of known optical tracking. A module 102 provides the kinematics tracking and combines the optical tracking and the kinematic tracking in an adaptable manner.

The process for optical tracking can be summarised in three steps. The first step comprises receiving an image of at least a part of the first vehicle 110 from the camera 101 mounted on the second vehicle 100, the camera image comprising a matrix of intensity values. The second step comprises processing the image to estimate the yaw angle 105a by analysing the content of a polar image extracted from the camera image. The third step comprises passing the measured yaw angle and confidence level to the module 102.

Figure 2:
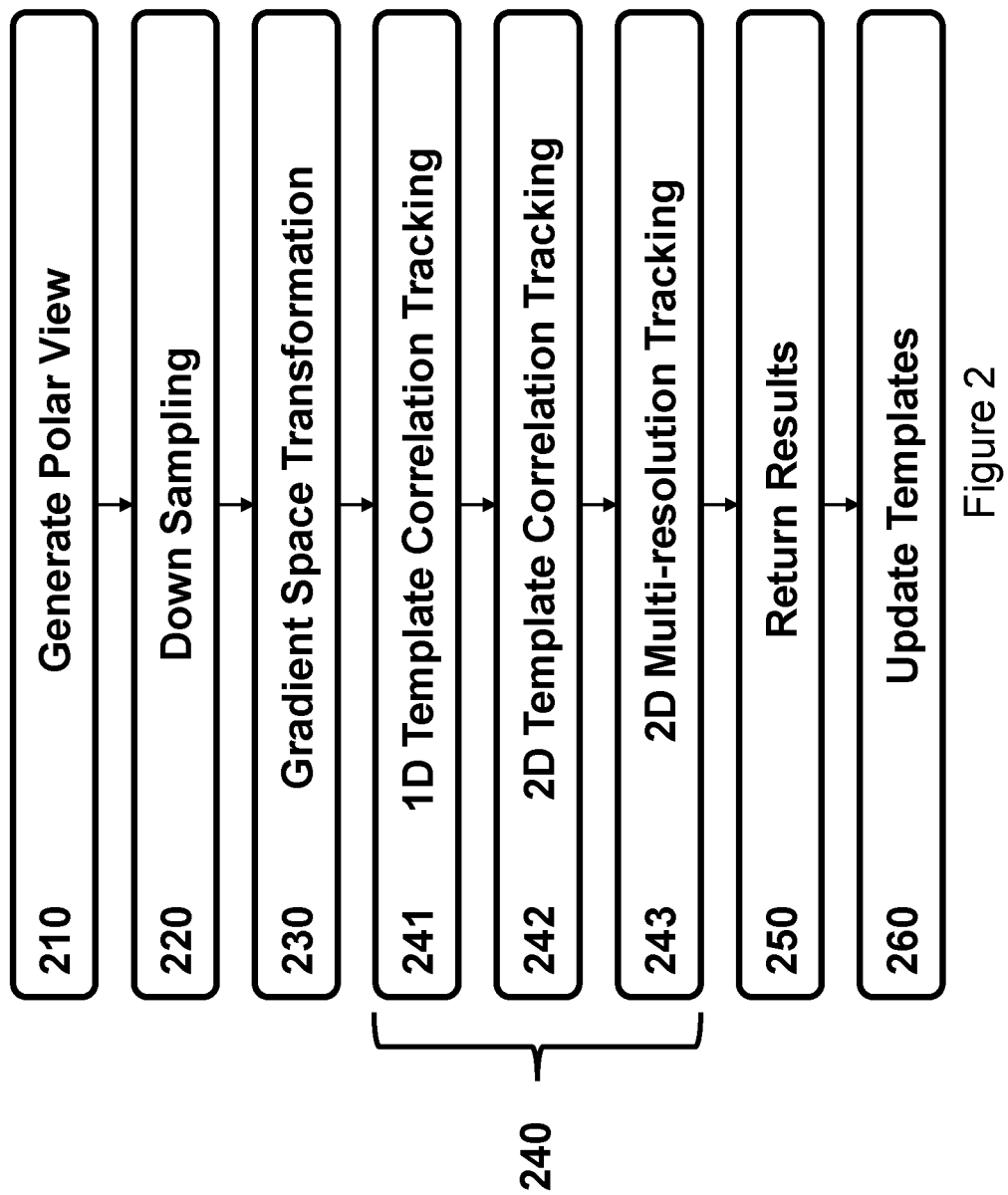
FIG. 2 shows a flow chart of an optical process to estimate a yaw angle.

In one embodiment of the present invention, the optical tracking comprises the steps show in FIG. 2. First a polar view is generated 210. Then, the polar view is down sampled 220 into smaller images. Then, one of the smaller images is transformed 230 into two gradient space images. Next multi-modal tracking 240 is performed by finding the location of templates in the transformed images and the location of templates in the smaller images and the polar view. The result of the search for the templates in the images is then used to estimate a plurality of yaw angles, each estimated yaw angle having a confidence level. The plurality of yaw angles are then combined into a yaw angle and a confidence level and these are reported 250. The templates used in the searching are then updated 260 if necessary. These steps will now be explained in more detail.

Figure 3:
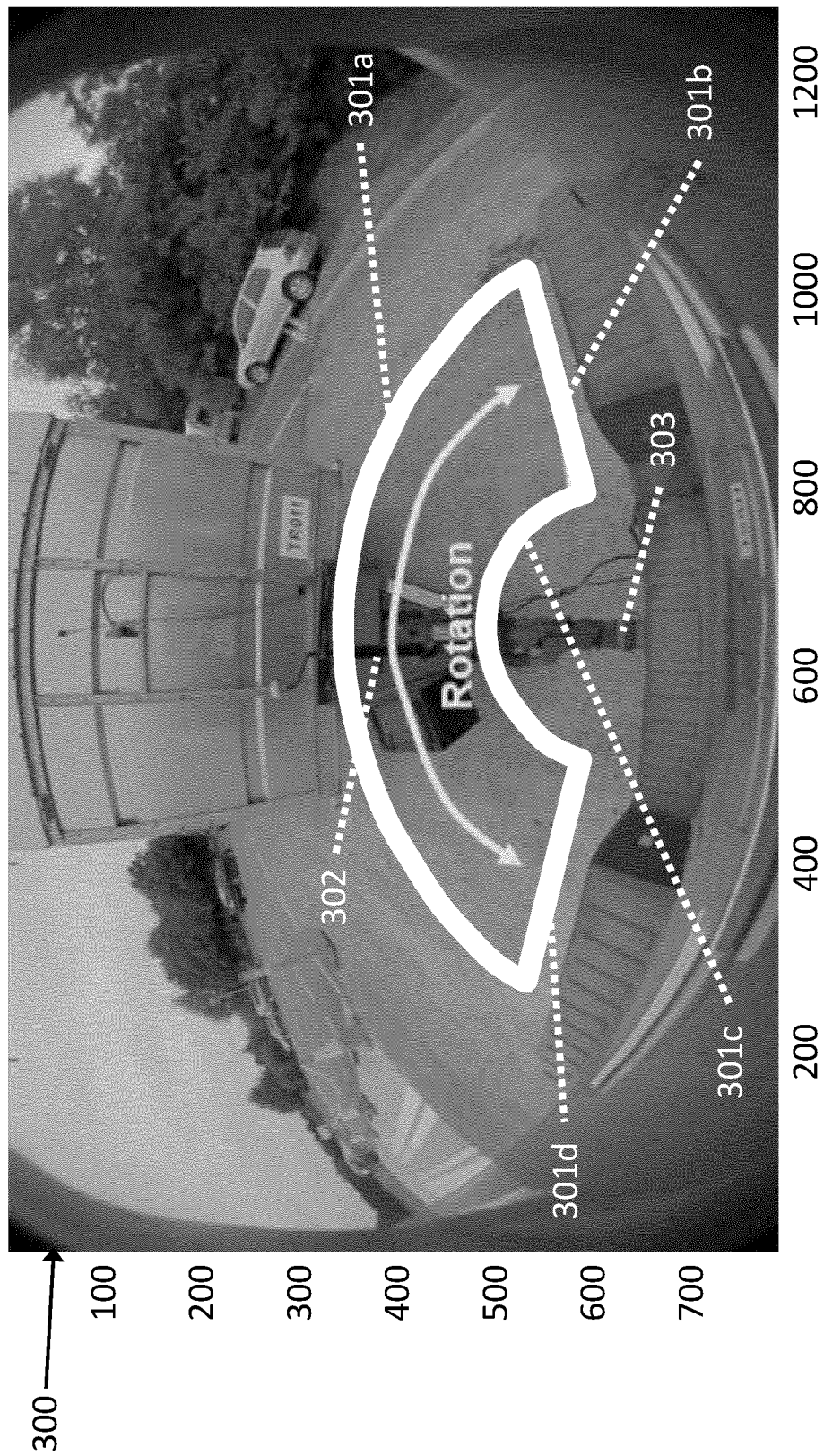
FIG. 3 shows an example image from a camera such as the mounted camera shown in FIG. 1. An overlay on the image shows a polar view selection.

FIG. 3 shows an example image 300 of an image from a camera mounted on a car orientated towards a trailer. The connector to the trailer is a tow bar 302 that pivots about a pivot point 303. A change in the yaw angle between the car and the trailer manifests as a rotation of the tow bar about the pivot point 303. By extracting a section of the image and transforming it to a polar coordinate projection, a polar view is generated.

Figure 4:
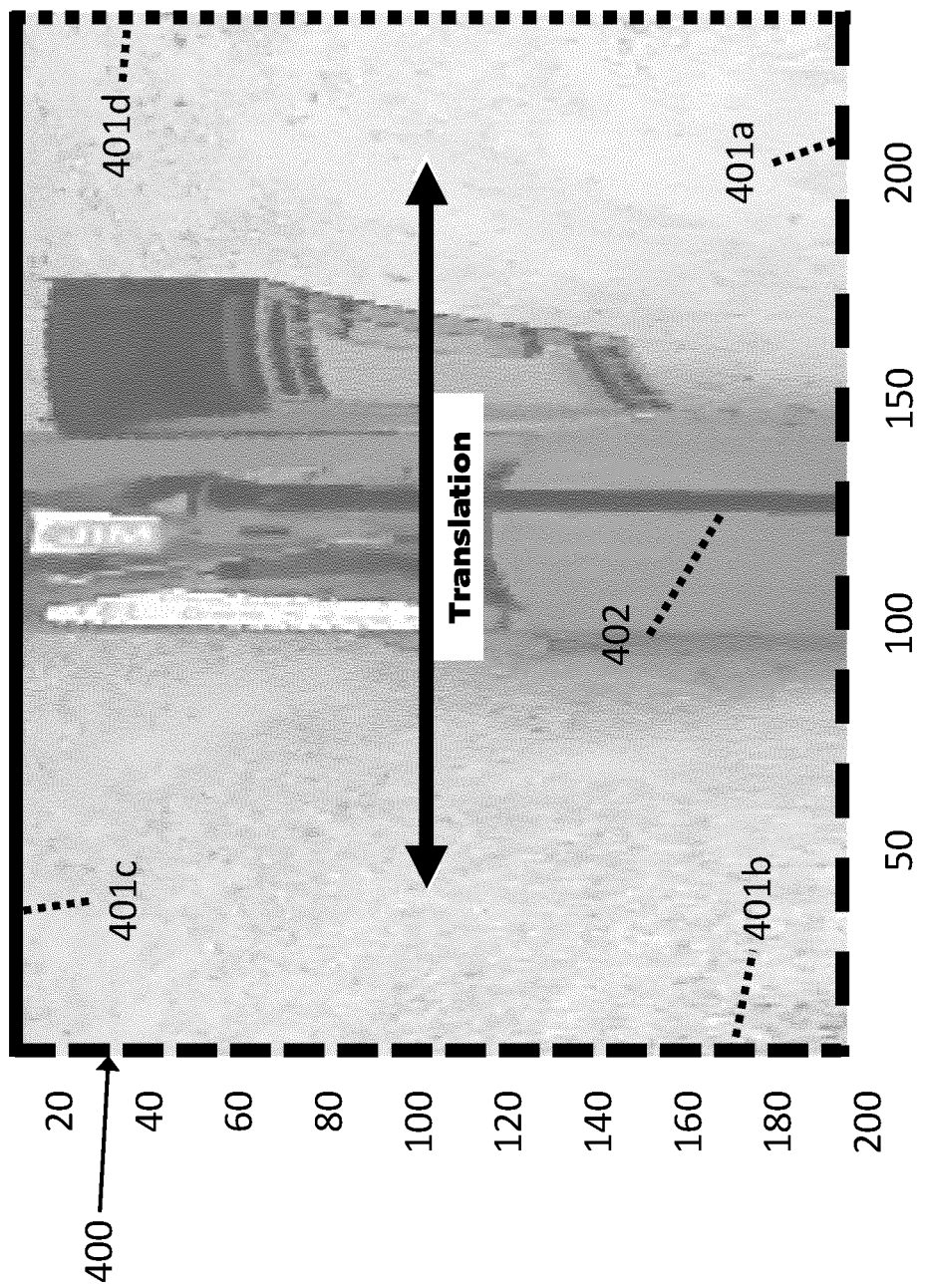
FIG. 4 shows an example polar view produced from the polar view selection shown in FIG. 3.

For later processing convenience, the polar view is also rotated by 180 degrees. An example polar view 400 shown in FIG. 4. This view has been generated from the white edged block arc section of the image 300 shown in FIG. 3. The edges of the block arc 301a-d in the image 300 correspond to the edges 401a-f in the polar view 400.

The centre of rotation of the block arc is aligned with the pivot point 303. The angular extent of the block arc typically covers all envisaged rotation of the tow bar 302 and the radial extent is set to avoid as much of the car and trailer as possible. The parameters defining the block arc may be fixed according to the vehicle and/or trailer. In other cases, the parameters are entered or adjusted by the user and/or automatically determined.

The effect of generating 210 a polar view is to convert the angular motion of a connector about a pivot point into a horizontal translation. Using a polar view makes the method compatible with almost any trailer type. For example, the towbar 302 shown in FIG. 3 has triangular features but in a polar view 400 a vertical structure 402 is obtained. The vertical structure 402 will horizontally translate as the tow bar 302 rotates about the pivot point 303.

Figure 5:
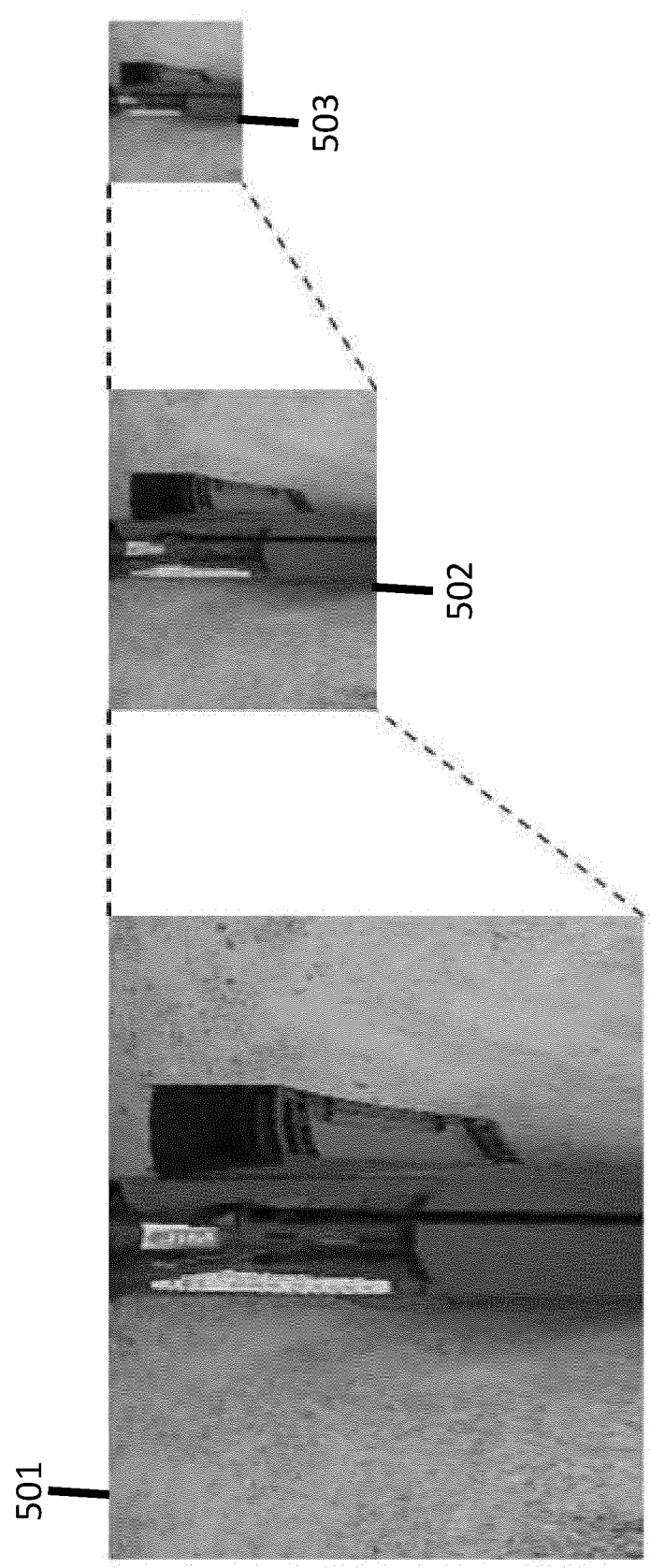
FIG. 5 shows processing steps applied to the image in FIG. 4 to form a pyramid of images.

An example of down sampling 220 is demonstrated in FIG. 5. In this process, a generated polar view is down sampled in two levels to two progressively smaller images. In the example shown in FIG. 5, the first level image 501 is a copy of the polar view. The second level image 502 is produced by down sampling the first level image 501 by a factor of 2 using, for example, a gaussian kernel. The third level image 503 is produced by down sampling the second level image 502 by a factor of 2 again, for example, using a gaussian kernel. The result of down sampling 220 is a pyramid of the same image at different resolutions. Such a pyramid of images enables resource efficient searching.

For example, when searching for the tow bar 302, a large region or full search of the third level image 503 may be performed. As the third level image 503 is small, this search can be fast. Once this first search is complete, its result can be used to perform a more focused search of a region of the second level image 502. Similarly, the result of the focused search of the second level image 502 search can be used to perform an even more focused search of the first level image 501.

Figure 6:
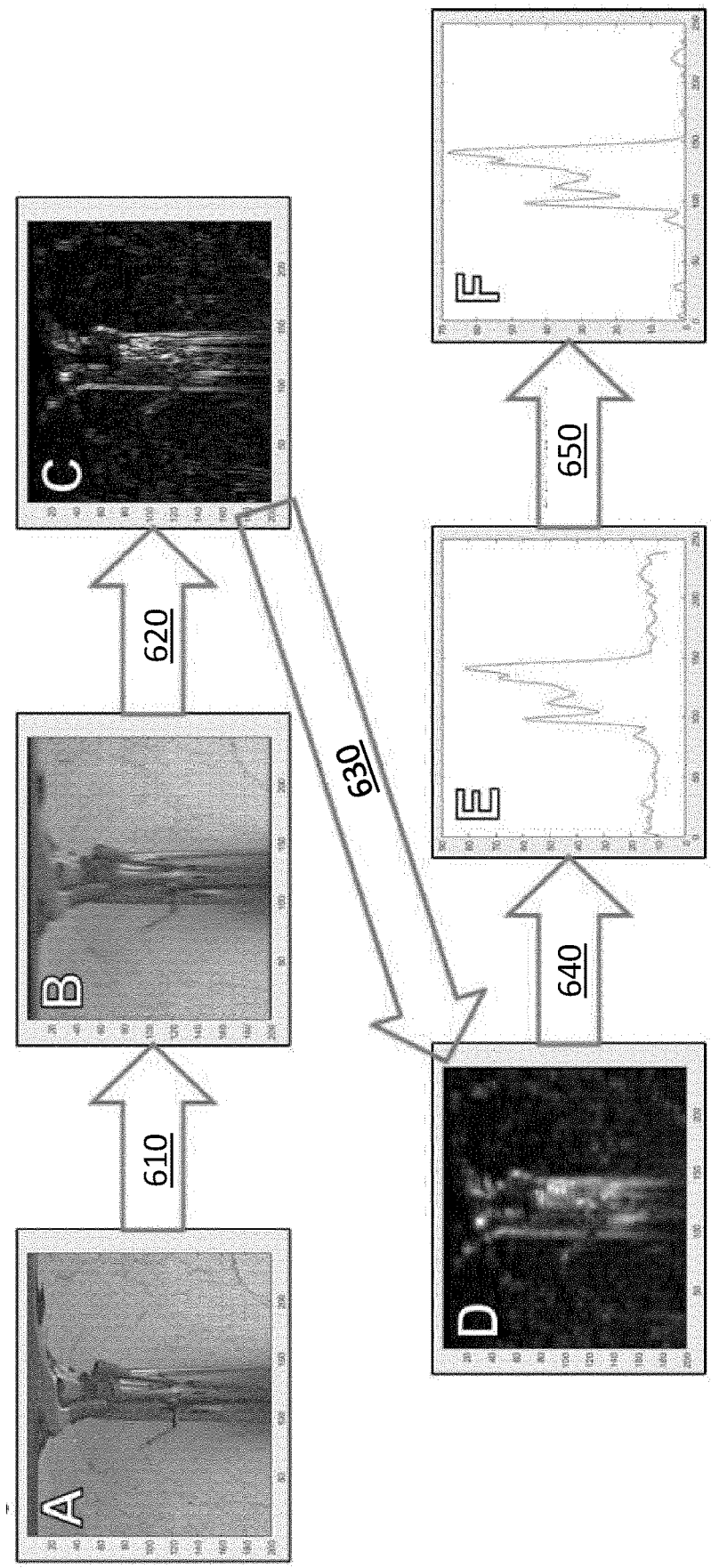
FIG. 6 shows a process for extracting one- and two-dimensional gradient images from the image in FIG. 5.

FIG. 6 shows an example of a transformation of the polar view image into gradient space. Transforming a polar view image into gradient space helps to further distinguish the vertical structure 402, representing the polar view of the tow bar 302. Performing analysis in gradient space and image space also increases the robustness of the optical tracking method.

The gradient space transformation in preferred implementations comprises vertical blurring 610 of the polar view image A and forming 620 an image C of the horizontal gradients after the vertical blurring B. The vertical blurring 610 suppresses non-vertical features such as road marking and shadows. Forming 620 an image of the horizontal gradients C boosts the contrast of the vertical structure 402 with the background. Alternatively, or additionally, a filter may be used that utilizes prior knowledge to help distinguish the vertical structure from the background. Preferably, the gradient space transformation is applied to the second level image 502 of the polar view image as this optimizes performance without too much loss of resolution.

The gradient space image is then horizontally blurred 630 to form a blurred gradient space image D. The blurred gradient space image D is then collapsed to a line profile E by plotting 640 the vertical means. Finally, the line profile is background corrected 650 by subtracting the median value and removing negative values to form 231 a one-dimensional gradient space template.

A two-dimensional gradient space template may be formed 232 from either the image of the horizontal gradients C or the blurred gradient space image D, or by any processing of the polar image that results in a two-dimensional gradient space representation of the tow bar 302.

The described processing forms gradient space images that are particularly good at distinguishing a tow bar from typical backgrounds. However, in other embodiments, the conversion to gradient space may be performed with different image processing steps.

Figure 7:
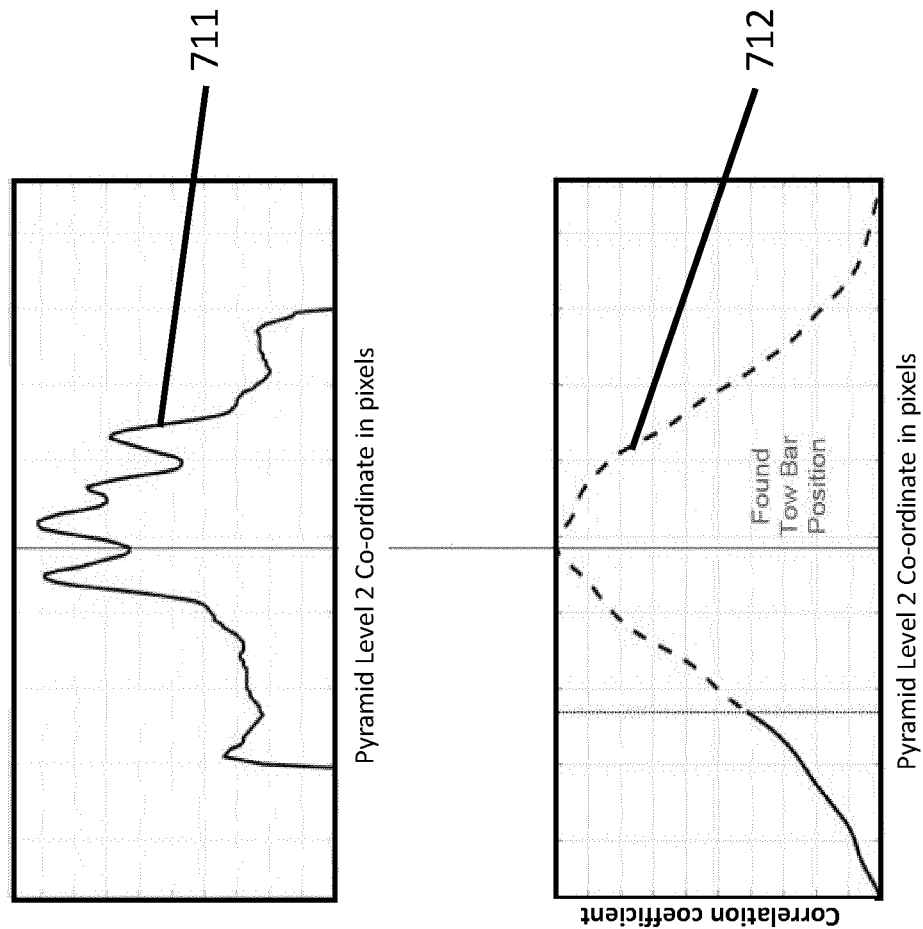
FIG. 7 shows a cross-correlation process to locate a one-dimensional gradient image line template image that was produced using the process in FIG. 6.
Figure 7:
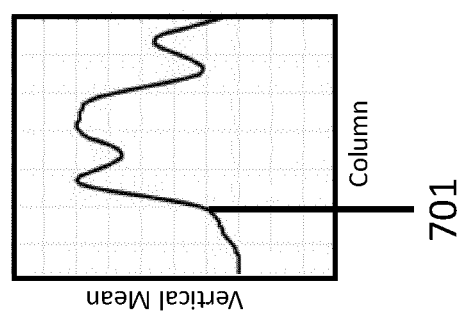

FIG. 7 demonstrates one-dimensional normalized cross-correlation tracking to measure the yaw angle. First, a one-dimensional gradient space template 701 is obtained. This template can come from a previous image processed in the manner described in FIG. 6. Alternatively, it can be loaded from a database of images or a stored copy from a previous operation of the system. In all cases, the one-dimensional gradient space template 701 can be updated as described below.

Image data from the vehicle mounted camera is then converted, by the process shown in FIG. 6, to a measured line profile 711. The one-dimensional gradient space template 701 is then cross-correlated with the measured line profile 711 at different positions. The result is a correlation coefficient plot 712. The maximum value in this plot is set as the position of the tow bar.

This one-dimensional gradient space tracking thus provides a first modality to assess the position of the tow bar. As the one-dimensional gradient space template 701 is only a line profile, it has only a minimal memory requirement and can therefore be stored when the system is not active. Permanent storage in this way also ensures that the method can quickly recover in the event of tracking loss.

Figure 8:
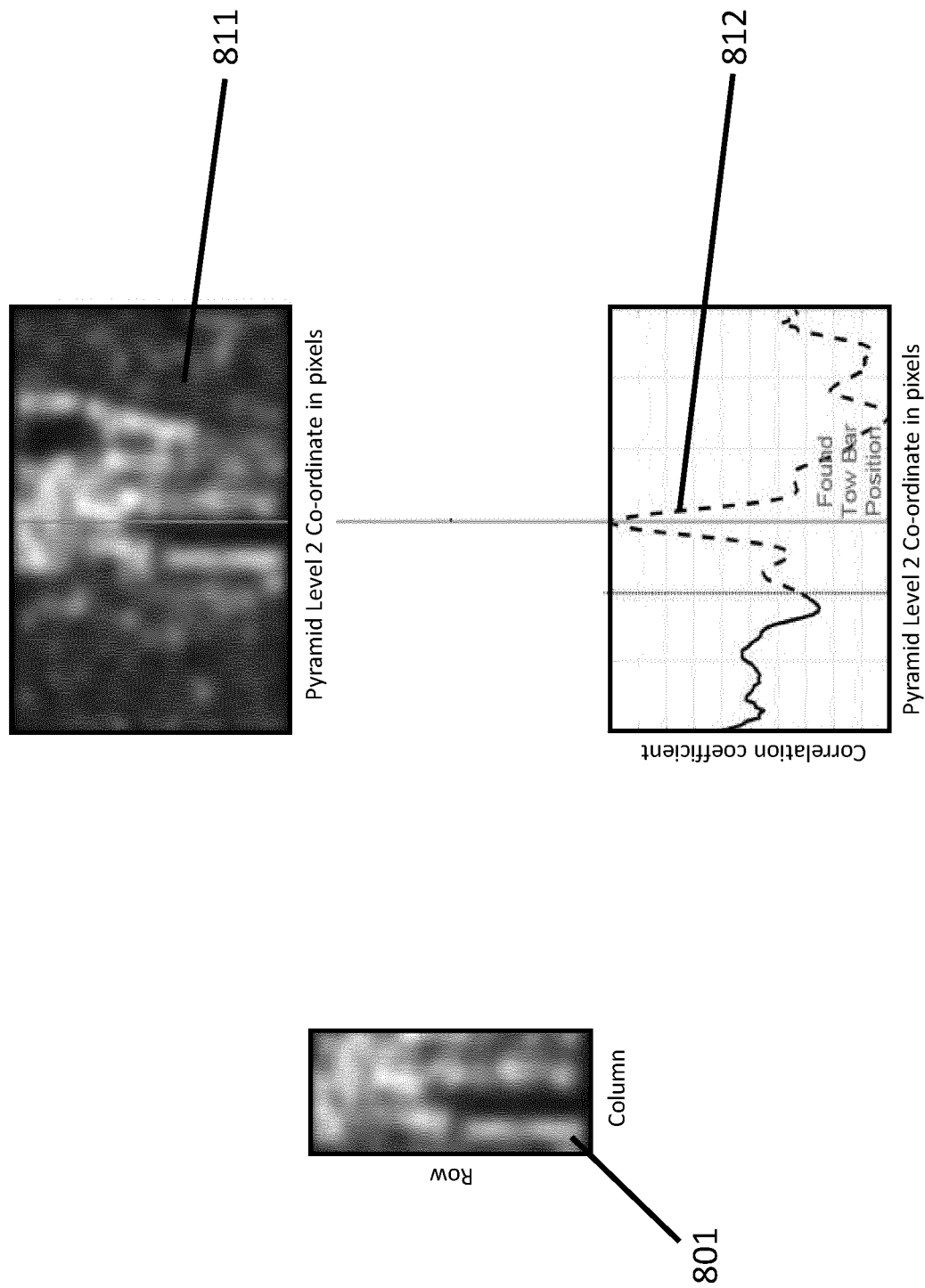
FIG. 8 shows a cross-correlation process to locate a two-dimensional gradient template image.

FIG. 8 demonstrates two-dimensional normalised cross-correlation tracking. In this case, a two-dimensional gradient space template 801 is obtained. Preferably this is the two-dimensional gradient space from a previous image processed by steps A to C or A to D of the process shown in FIG. 6. Alternatively, it can be loaded from a database or a stored copy from a previous operation of the system. In all cases, the two-dimensional gradient space template 801 can be updated as described below.

Image data from the vehicle mounted camera is then converted, by steps A to C or A to D of the process shown in FIG. 6, to a two-dimensional gradient space image 811. The two-dimensional gradient space template 801 is then cross-correlated with the two-dimensional gradient space image 811 for a series of horizontal offsets between the two-dimensional gradient space template 801 and the two-dimensional gradient space image 811. The result is a correlation coefficient plot 812. The maximum value in this plot is set as the position of the tow bar.

This two-dimensional gradient space tracking thus provides a second modality to assess the position of the tow bar. The two-dimensional normalised cross-correlation tracking exploits the good identification of the tow bar in gradient space. Low resolution and precision limitation due to the steps in the gradient space transformation make the result robust enough to be used as reference for error detection.

A third tracking modality operates in image space rather than gradient space and uses two-dimensional, multi-resolution tracking with normalized cross-correlation of adaptive templates. This modality uses two templates images that are updated at different frequencies. In a preferred embodiment, there are two template images. The first template image is called the "updated template" and is updated as-often-as-possible. The second template image is called the "reference template" and this is only updated as needed. The updated template ensures good matching over changing background or lighting conditions. The reference template ensures precision and protects against systematic error accumulation.

When the system starts the two image space templates may load from one or two predetermined images. The one or two predetermined images may come from a database of the values from the last time the system operated. The third tracking modality uses the pyramid of images produced in the process shown in FIG. 5.

Optionally, search begins in the smallest level, which is the third level image 503, using the updated template and an optional search window. The search window will be provided if the result of a previous measurement was a yaw value with high confidence. Whether this step occurs and the size of the search windows may be set by considering the difference in the output of the third tracking modality relative to the first and second tracking modalities and/or to relative to an result formed from an aggregation of the result of all tracking modalities.

The result of the search of the third level image 503 for the updated template is a first location in the third level image 503. In all steps of the search, only horizontal shifts need by considered due to the use of polar images of the tow bar.

The search proceeds in the second level image 502 using the reference template in a tight window around the corresponding location in the second level image 502 to the first location in the third level image. The result of the more focused search of the second level image 502 is a second location in the second level image 502.

The final process measures the correlation coefficients of the first level image 501 with the reference template in several locations in a region. The region is centred on the corresponding location in the first level image 501 to the second location in the second level image 502. Once the correlation coefficients have been calculated, the centre of the area under the correlation coefficient distribution is determined to find a central peak, which is the third location.

By processing of the correlation coefficients in this way, the third location is a subpixel level measurement of the position of the tow bar. Thus, the two-dimensional, multi-resolution tracking with normalized cross-correlation of adaptive templates provides a third modality to assess the position of the tow bar. The sub-pixel precision boost enables smooth angular motion tracking for better error detection such as jitter.

An optional step in optical tracking is for at least one, preferably all tracking modalities, to estimate the confidence in their provided measurements. As all optical tracking modalities involve producing a normalized correlation coefficient plot, the confidence can be estimated from the shape of the correlation coefficient plot. However, in other embodiments, different matching metrics may be used.

The sub-pixel precise angle of the two-dimensional image space tracker may be error corrected and have its confidence estimated using the results from the first (one-dimensional gradient space tracking) and second (two-dimensional gradient space tracking) tracking modalities. The error corrected sub-pixel precise result from the third tracking modality is then passed to a combining module. In a preferred embodiment, the module is a Kalmann based Angle Estimater, KAES, module.

The confidence values of current and past yaw angle measurements control whether and how often the two gradient space templates (the one-dimensional gradient space template 701 and the two-dimensional gradient space template 801) and the two image space templates (updated template and reference template) are updated. This allows excellent temporal adaptation to changing lighting and background conditions.

Whilst the use of polar image is convenient and easy to implement, having read the above, the skilled person would realize that mathematically equivalent processing in normal (Cartesian) image space is possible. For example, vertical blurring in a polar image is equivalent to radial blurring with the pivot point as the point of origin of the radial blurring. Similarly, horizontal gradients assessment in polar space is equivalent to circular gradients calculated about the pivot point.

In addition to the optical tracking explained above, there is a separate kinematic tracking system. This operates differently depending on whether the vehicle is driving forward or backwards.

When driving forward, the yaw angle is estimated using a kinematic model of the vehicle and trailer that is updated with odometry data from an odometer mounted on the vehicle or trailer. The estimating yaw angle is reliable as a reference for forward driving if systematic errors (e.g. tyre deformation, tyre slip, vehicle inertia on steering inputs) are taken into account. The estimated yaw angle is directly compared to the yaw angle from optical tracking angle and/or a previously calculated yaw angle to calculate a confidence measure. The calculated confidence measure linearly scales with the actual deviation of the respective angle.

When driving backward, the calculated angle that is used in the forward drive scenario is unstable and thus it should not be used as reference for confidence estimation. Instead, the angular rate of change of the trailer angle is used as a reference. If the last optical angle or a previously calculated yaw angle are assumed as correct, the angles may be used as a seed for the kinematic model and the theoretical angular rate can be calculated using the odometry data from the odometry. This simulated rate is ideally identical to the measured angular rate of said angles between the last and the current value.

To take noise into account, the calculated and measured rates from the kinematic model and the optical tracker are buffered for 5 to 10 frames. These rates are compared over constantly refreshing buffers. Average measured rate and the average calculated rate are compared, and the rate discrepancy is modulated to estimate the angular error and give a confidence value that scales with the angular error for the kinematic angle and the optical tracking angle.

For both forward and backward driving scenarios, the confidence value, scaling with the angular error, is a reliable measure to detect and quantify tracking issues.

In one embodiment, the information from the optical tracking and the kinematic tracking is combined in a Kalman Angle Estimation, KAES, module 900. The KAES module combines all available tracking information and reports a combined or KAES angle along with a confidence in the KAES angle. The combination of the yaw angles is performed using a Kalman filter. The Kalman filter uses dynamic weights, which are adjusted dynamically by the driving scenario and the confidence. In a preferred embodiment, the algorithm that is implemented in the KAES module is:

$$\dot{\varphi} = -\frac{v}{l_t} \cdot \sin(\varphi) - \frac{v}{l_f} \cdot \left(1 + \frac{l_h}{l_t} \cdot \cos(\varphi)\right) \cdot \tan(\delta_f)$$

$\varphi$: hitch angle $\dot{\varphi}$: hitch angle rate $\delta_f$: front wheel angle $v$: vehicle velocity $l_f$: vehicle wheel base $l_h$: distance from reat axle to hitch $l_t$: distance from hitch to trailer axle where the hitch angle is the yaw angle.

Figure 9:
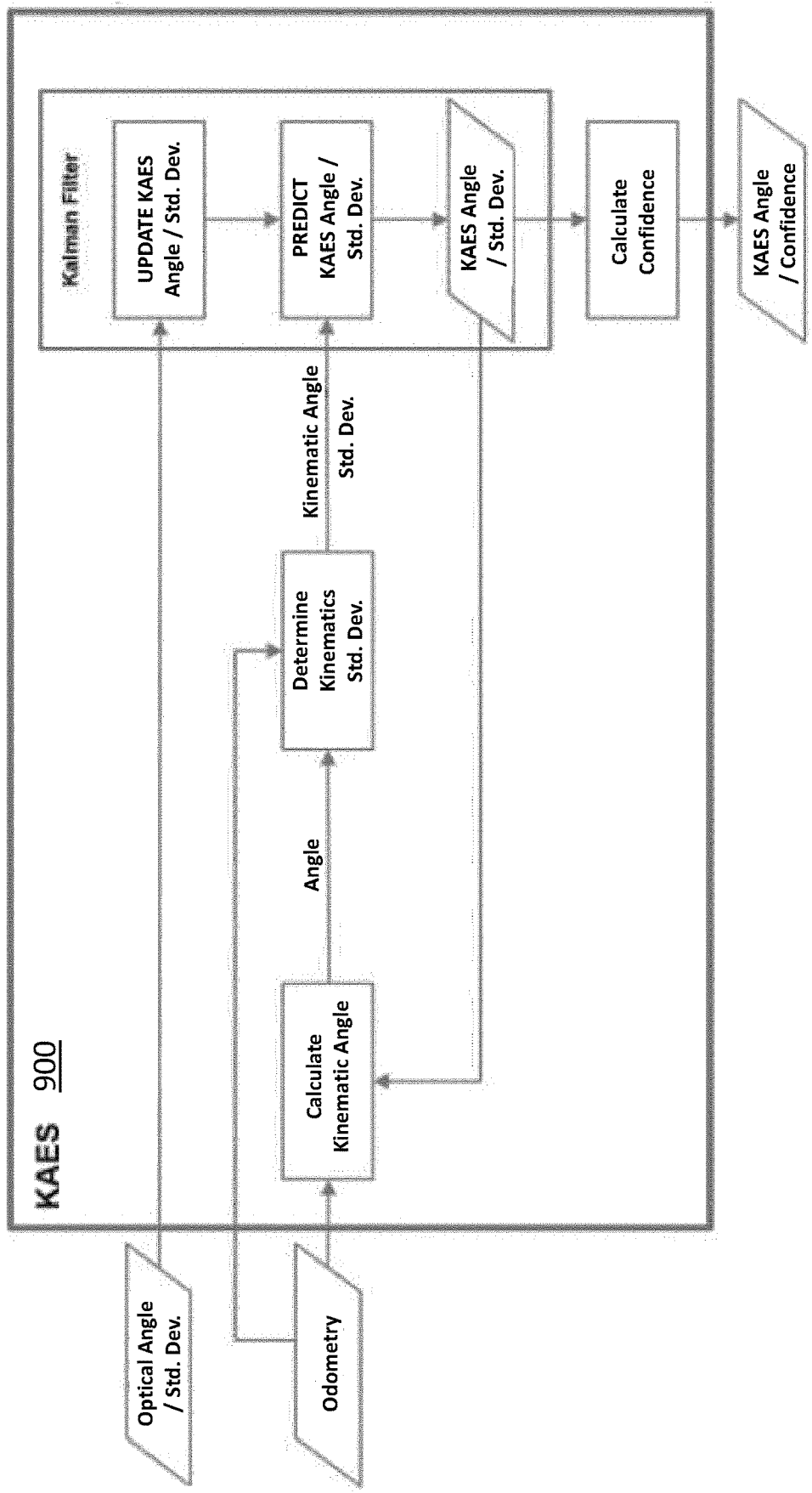
FIG. 9 shows a Kalman based Angle Estimate, KAES, module.

An example of a KAES module 900 is shown in FIG. 9. The KAES module 900 uses an identical kinematic model to that used when estimating confidence in the kinematic model. For every frame, the internal state is predicted once using the kinematic model and then updated by a Kalman filter using the yaw angle obtained by optical tracking.

Tracker variance scales with the confidence, which helps reduce the impact of minor tracking issues. In more detail, when driving forward, the variance of the angle predicted by kinematic tracking is set lower than the variance of the angle predicted by optical tracking. The combined yaw angle reported by the KAES module 900 is therefore dominated by kinematic tracking. Thus, any optical tracking issues can be safely detected and corrected without impacting the output KAES angle.

The optical tracking variance is calculated from the confidence reported by the optical tracking models described above. If an issue is present that might result in error or inaccuracy in the output of the optical based tracking, the reported confidence of the optical tracking will be low, this will prevent unwanted influences or degradation of the yaw angle reported by the KAES module.

When driving backwards, the variance of the angle predicted by kinematic tracking is set much higher than the variance of the angle predicted by optical tracking. The yaw angle reported by the KAES module is therefore dominated by the optical tracking in this case.

The KAES module thus accurately combines the results from the tracking methods, offers single frame initialisation and recovery, and offers a highly robust and precise yaw angle tracking solution with high availability.

Figure 10:
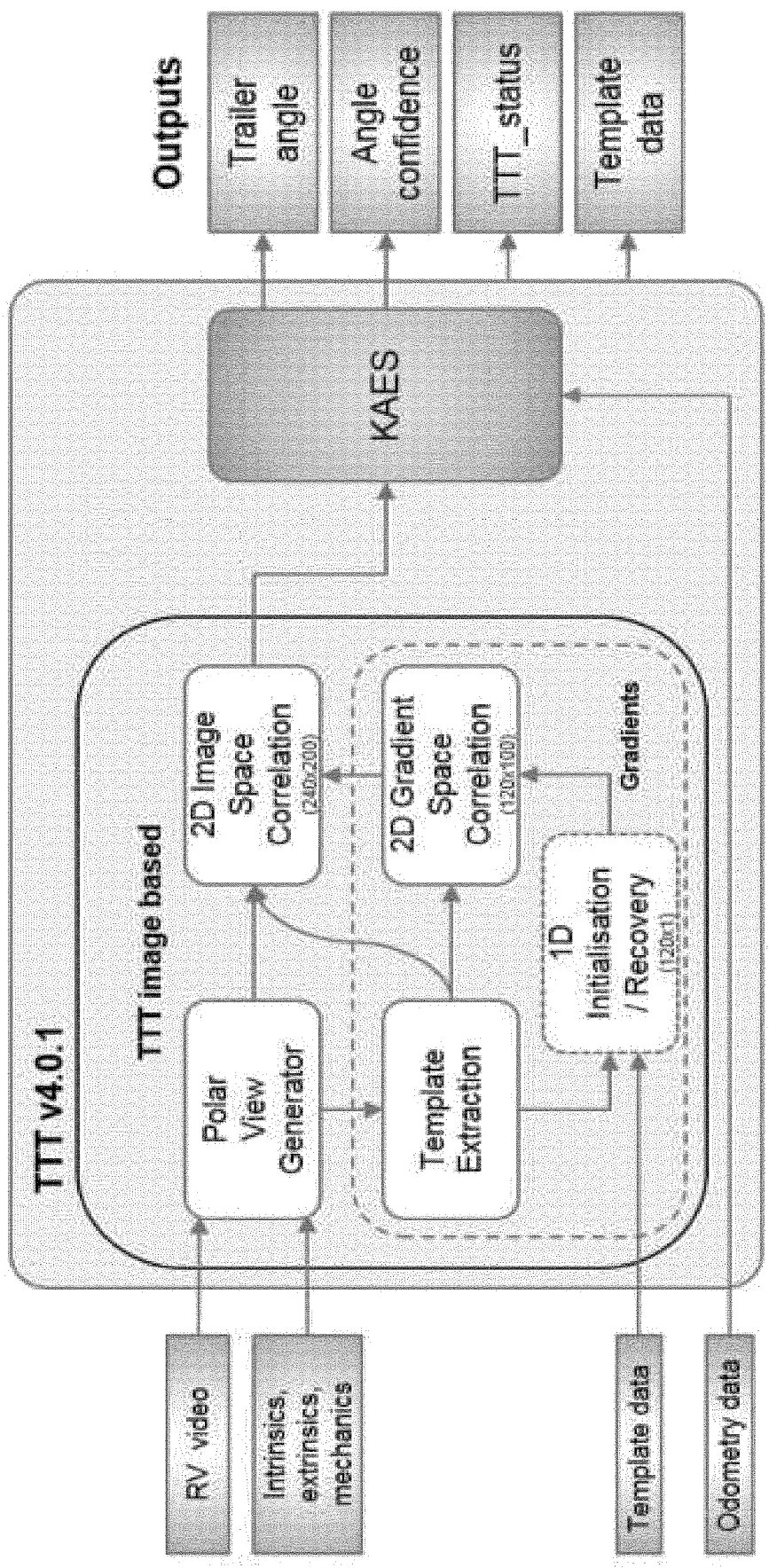
FIG. 10 shows is a schematic of an overall system to track a yaw angle.

FIG. 10, provides a schematic summary of an embodiment of the invention. In summary, the embodiments of the present invention combine multimodal optical tracking for error robustness with kinematic tracking using a Kalman filter for redundancy and thereby improved robustness.

By tracking a tow bar optically in the manner explained above, a universal tracking solution is presented as all trailers must have a trackable feature. Due to the KAES module adjusting the weighting in the combination of the optical and the kinematics tracking, all available tracking information is optimally used.

An exemplary use case is driving a car with an attached trailer. Manoeuvring with an attached trailer in reverse can be challenging even for experienced driver. To support the driver, several assist functionalities or even autonomous driving are possible to use. A crucial condition for such functionalities knowledge of the exact yaw angle. Continued errors in determined yaw angles can lead to a deactivation of trailering assist functionalities for safety. Thus, accurate robust knowledge of the yaw angle guarantees optimal availability of trailering assist functionalities.

The described methods also may help vehicle drivers trust a displayed yaw angle. For example, it will mean a car driver who is viewing a trailer yaw angle, via a display mounted inside the car, does not have to physically confirm the displayed yaw angle by getting out to check which way the trailer is pointed.

The invention claimed is:

1. A method, for providing a coupling angle defining the yaw angle between a first vehicle coupled to a second vehicle, comprising:
   receiving an image of at least a part of the first vehicle from a camera mounted on the second vehicle, the image comprising a matrix of intensity values;
   performing a polar transformation on at least a part of the image to form a polar image in a polar space having an origin corresponding to a location of a pivot point of the coupling to the second vehicle in said received image coordinate space;

estimating an optical coupling angle by analysing the content of the polar image;

receiving a signal from an odometer mounted on the first or second vehicle;

estimating a kinematic coupling angle using a kinematic model of the first vehicle and the coupled second vehicle, wherein the kinematic model is based on the signal;

combining the estimated optical coupling angle and the estimated kinematic coupling angle to provide said coupling angle; and reporting the coupling angle.

2. The method of claim 1, wherein:

the estimated optical coupling angle comprises an optical coupling angle and a confidence level for the optical coupling angle;

the estimated kinematic coupling angle comprises a kinematic coupling angle and a confidence for the kinematic coupling angle; and said combining further provides a confidence for the coupling angle; and the method further comprises reporting the confidence in the coupling angle.

3. The method of claim 2, wherein combining the estimated optical coupling angle and the estimated kinematic coupling angle comprises accounting for factors comprising:

the confidence level for the optical coupling angle;

the confidence level for the kinematic coupling angle; and the motion of the first or second vehicle.

4. The method of claim 3, wherein accounting for the motion of the first or second vehicle is based on whether the second vehicle is driving in a forward direction away from the first vehicle or in a backward direction toward the first vehicle.

5. The method of claim 1, wherein processing the polar image comprises:

determining a plurality of optical coupling angle estimates by locating a respective plurality of templates in the polar image content; and combining the plurality of optical coupling angle estimates into said estimated optical coupling angle.

6. The method of claim 5, wherein analysing the polar image content further includes updating at least one of the respective plurality of templates.

7. The method of claim 5, wherein determining a plurality of optical coupling angle estimates by locating a respective plurality of templates in the polar image content comprises:

forming a one-dimensional gradient space representation from the polar image content;

forming a two-dimensional gradient space representation from the polar image content;

determining a first optical coupling angle estimate by correlating a one-dimensional gradient template and the one-dimensional gradient space representation from the polar image content;

determining a second optical coupling angle estimate by correlating a two-dimensional gradient template and the two-dimensional gradient space representation from the polar image content; and determining a third optical coupling angle estimate by correlating an image template with the polar image.

8. The method of claim 7, wherein forming a gradient space representation from the polar image content comprises:

blurring of the polar image in a first direction aligned with a connector between the first and second vehicles; and calculating a gradient image in a second direction perpendicular to the first direction.

9. The method of claim 8, wherein forming a one-dimensional gradient space representation from the polar image content comprises:

blurring the gradient image in the second direction; and calculating a line profile of mean values in the first direction.

10. The method of claim 7, wherein correlating an image template with the polar image comprises:

obtaining a first template image and a second template image;

searching at least a portion of a down-scaled polar image—to find a matching location for the first template image;

defining a matching region of a down-scaled polar image comprising the matching location, the search region being smaller than the portion of the polar image;

correlating the second template image with the polar image in the matching region to form a correlation coefficient distribution;

identifying a precise matching location by determining the centre of the area under the correlation coefficient distribution; and determining the third optical coupling angle estimate from the precise matching location.

11. The method of claim 10, comprising:

updating the content of the first template image at a first frequency; and updating the content of the second template image at a second frequency, wherein the first frequency is higher than the second frequency.

12. The method of claim 11, wherein combining the estimated optical coupling angle and the estimated kinematic coupling angle to provide said coupling angle comprises:

transmitting an estimated optical coupling angle to a module;

transmitting an estimated kinematic coupling angle to the module;

assigning weights to the transmitted coupling angled and combining the weighted estimated coupling angles; and outputting from a combined coupling as said coupling angle.

13. The method of claim 12, wherein the transmitting coupling angles each have an associated confidence level and the assigned weight to each transmitted coupling angle is assigned with a Kalman filter considering:

the confidence level of the considered coupling angle; and whether the second vehicle is driving in a forward direction.

14. A module for a vehicle, configured to determine a yaw angle between the vehicle and a coupled vehicle, wherein the module operates according to claim 1.

15. A computer program product comprising computer readable instructions stored on a computer readable medium which when executed in a module of a vehicle are configured to perform the steps of claim 1.

16. The method of claim 1, wherein analysing the content of the polar image comprises performing a tracking modality comprising correlating a template and a representation of the polar image.

17. The method of claim 16, wherein the tracking modality comprises one or more of:

a gradient space tracking modality comprising:
  forming a gradient space representation from the polar image content, and
  correlating a gradient template and the gradient space representation, and
an image space tracking modality comprising correlating an image template with the polar image.

18. The method of claim 16, wherein:
correlating a template and a representation of the polar image forms a correlation coefficient distribution; and
estimating the optical coupling angle comprises selecting a horizontal offset that maximizes the correlation coefficient distribution.

* * * * *